United States Patent
Riezebos

(10) Patent No.: US 6,629,241 B1
(45) Date of Patent: Sep. 30, 2003

(54) DATA PROCESSING APPARATUS WITH NON-VOLATILE MEMORY FOR BOTH PROGRAM AND DATA

(75) Inventor: Dirk Jan Riezebos, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 580 days.

(21) Appl. No.: 09/639,152

(22) Filed: Aug. 16, 2000

(30) Foreign Application Priority Data

Aug. 24, 1999 (EP) .............................................. 99202727

(51) Int. Cl.[7] ................................................. G06F 9/00
(52) U.S. Cl. ........................................ 713/100; 711/103
(58) Field of Search ........................ 713/1, 100; 711/103

(56) References Cited

U.S. PATENT DOCUMENTS

| | | | |
|---|---|---|---|
| 4,665,480 A | | 5/1987 | Robert et al. .............. 364/200 |
| 5,522,076 A | * | 5/1996 | Dewa et al. ................ 713/2 |
| 5,535,357 A | * | 7/1996 | Moran et al. ............... 711/103 |
| 5,819,087 A | * | 10/1998 | Le et al. ................... 713/2 |
| 6,412,055 B2 | * | 6/2002 | Tallo et al. ................ 711/173 |

* cited by examiner

Primary Examiner—Dennis M. Butler
(74) Attorney, Agent, or Firm—Steven R. Biren

(57) ABSTRACT

A programmable non-volatile memory supplies of instructions and data to a processing unit. A program stored in the non-volatile memory contains an instruction for jumping to a subprogram in an auxiliary memory. The subprogram changes data in the non-volatile memory for use by the program and returns control to the program in non-volatile memory when completion of the change is detected. Control can be transferred back from the subprogram to one or more instructions in the non-volatile memory after suspension of data changing before said changing is complete. Changing is resumed upon return of control from the one or more instructions to the subprogram.

6 Claims, 2 Drawing Sheets

DATA PROCESSING APPARATUS WITH NON-VOLATILE MEMORY FOR BOTH PROGRAM AND DATA

FIELD OF THE INVENTION

The field of the invention is a data processing apparatus with a processor and a programmable non-volatile memory that stores both instructions of a program and data used by that program.

BACKGROUND OF THE INVENTION

U.S. Pat. No. 4,665,480 discloses a data-processing system that stores both instructions and data in the same non-volatile memory (EEPROM). The data values may change during execution of the program. This causes problems, particularly when the non-volatile memory needs to be erased during execution, because the memory is not accessible to load instructions for execution by the processor while erasing is going on. In a non-volatile memory with floating gate transistors for example, charge has to be transferred to or from the floating gates when the data is changed. This charge transfer takes much more time than reading. The memory is not available for reading during the charge transfer.

To solve this problem, the known processing system provides for a small auxiliary memory. In the auxiliary memory a subprogram is stored that controls the change in content of the non-volatile memory. When a program in the non-volatile memory needs to change the data in the non-volatile memory, the program transfers control to the subprogram. Thus, the processor can continue to load and execute instructions from the auxiliary memory while the data value in the non-volatile memory is changed.

The subprogram causes the processor to poll the non-volatile memory, to see whether changing of the data value has completed. When completion is detected, the subprogram transfers control back to instructions in the non-volatile memory, which is then again accessible to provide those instructions to the processor for execution.

SUMMARY OF THE INVENTION

It is an object of the invention to enable the processing apparatus to make more use of the instructions in the non-volatile memory.

It is a further object of the invention to enable the processing apparatus to handle situations where a real-time response is needed during said changing of the data, without requiring a large additional memory for instructions to control that response.

The data processing system according to the invention is set forth in claim 1. In the data processing system, changing of data is executed under control of instructions from an auxiliary memory.

According to the invention, the data processing system suspends changing of data in the non-volatile memory before said changing is complete. The system transfers control back from instructions in the auxiliary memory to instructions in the non-volatile memory during the suspension of changing. Subsequently the instructions in the non-volatile memory transfer control back to the auxiliary memory and changing is resumed.

Thus, it is possible to execute instructions from the non-volatile memory before changing of data in that non-volatile memory is complete, i.e. at a point in time where the non-volatile memory would normally prevent access while said changing is going on. Without suspension, an additional memory would be needed for these instructions. This would have to be an additional non-volatile memory if these instructions have to be replaceable and to be stored permanently (also when the power is removed).

The suspension of changing data in the non-volatile memory is achieved for example by removing a high voltage from the memory, so that charging or discharging of floating gates is interrupted and the floating gates for the changing data are left with a logically indefinite charge state, between the states that correspond to logic 1 and 0 respectively. Of course, the charge on the floating gates used for program instructions is not affected during changing of data.

The facility to suspend changing of data may be used to perform various kinds of processing during the suspension. For example, the processor may handle an interrupt generated during changing of the data. In this case, the suspension of changing may be generated by interrupt hardware, or by an instruction in auxiliary memory that is executed in response to the interrupt.

Alternatively, a subprogram in the auxiliary memory may start instructions in the non-volatile memory after some computed time-interval has elapsed. As an alternative, the suspension may be triggered by an exception that occurs during the execution of an instruction from the auxiliary memory, such as a software trap, a program jump to a location in the non-volatile memory etc. Again in this case, the suspension of changing may be generated by interrupt hardware, or by an instruction in auxiliary memory that is executed in response to the interrupt.

In an embodiment of the invention the instructions the processor tries to predict which instructions from non-volatile memory will be needed during the changing data in the non-volatile memory. The expected instructions are loaded into the auxiliary memory, so that they can be executed without suspending changing of the data. For other possible, but less likely, instructions provisions are made to suspend changing of data in the non-volatile memory and execution of instructions from the non-volatile memory.

BRIEF DESCRIPTION OF THE DRAWING

These and other advantageous aspects of the invention will be described by way of non-limitative illustration, using the following figures.

DESCRIPTION OF THE PREFERRED EMBODIMENTS

Figure 1:
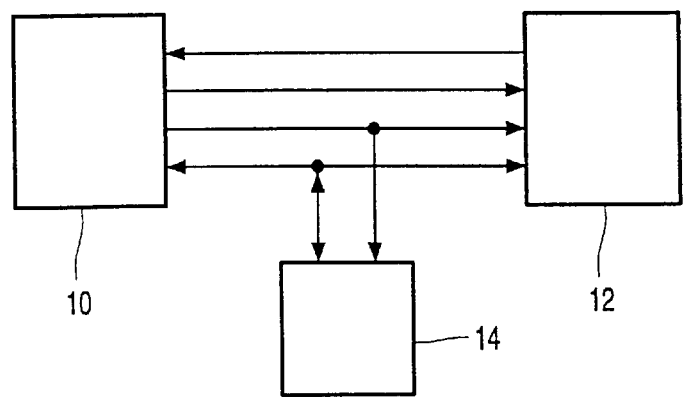
FIG. 1 shows a data processing apparatus.

FIG. 1 shows a data processing apparatus. The apparatus contains a processing unit 10 (for example a 80C51 processing core), a programmable non-volatile memory 12 (preferably a flash EEPROM) and an auxiliary memory 14 (for example a 16 byte RAM memory). The processing unit 10 has address and data connections to the non-volatile memory 12 and the auxiliary memory 12. The non-volatile memory 14 has a "ready" output and a "suspend change" input coupled to the processing unit 10. The non-volatile memory 12 contains instructions for execution of a program in processing unit 10.

The apparatus shown in FIG. 1 is a low-cost apparatus, containing a minimal amount of memory. For cost reasons a single non-volatile memory is provided for storing both instructions and data for use by the instructions. The memory regions for storing instructions and data are so related that the non-volatile memory would normally prevent access to the instructions while the value of data is changed.

Figure 2:
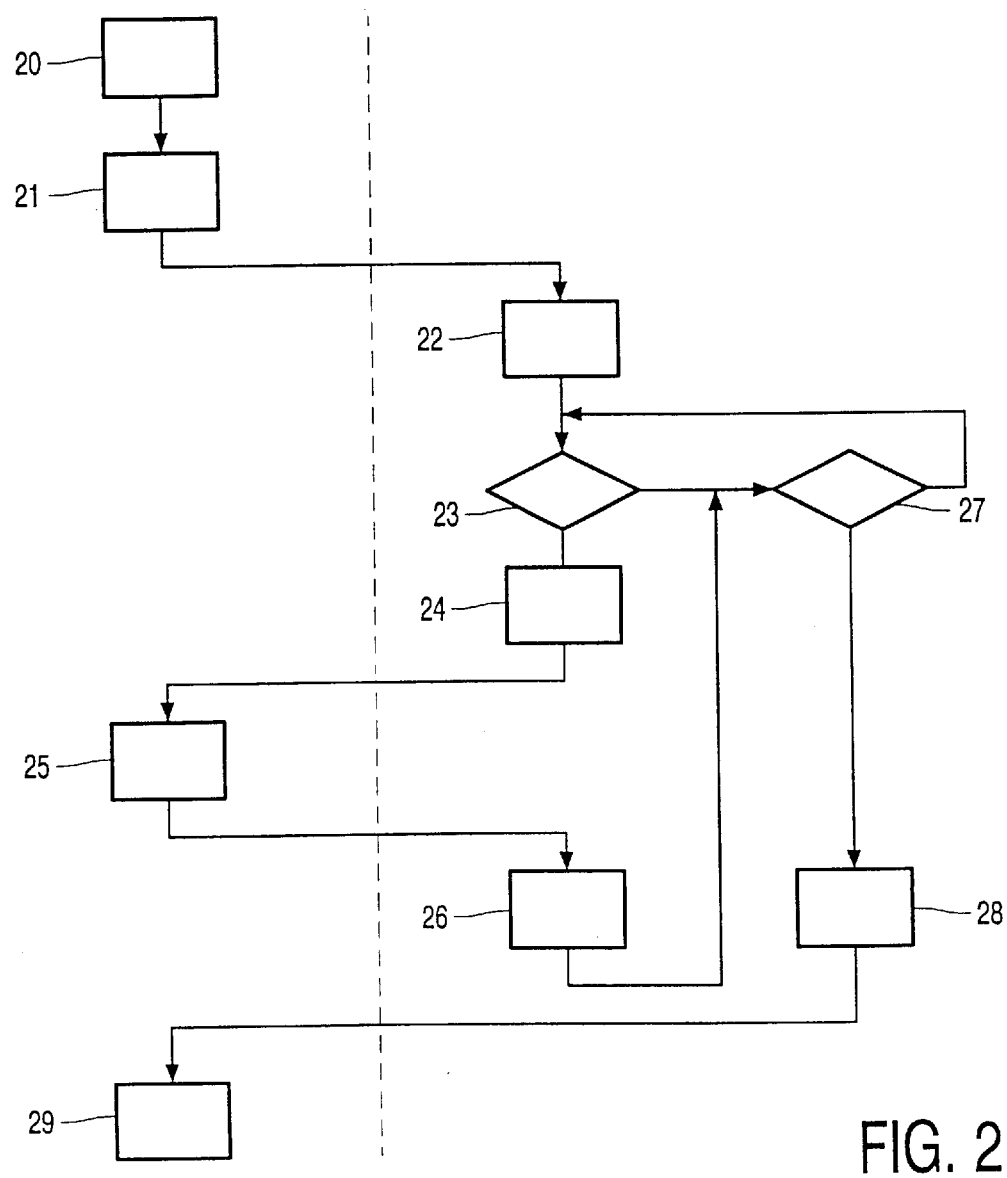
FIG. 2 shows a flow chart for changing data and executing instructions in the non-volatile memory.

FIG. 2 shows a flow chart of program execution. Program parts 20, 21, 25, 29 that consist of instructions loaded from non-volatile memory 12 are shown separated by a dashed line 18 from program parts 22, 23, 24, 26, 27, 28 that consist of instructions loaded from auxiliary memory 14.

In a first program part 20, the processing unit 10 executes normal instructions loaded from non-volatile memory 12. These instructions may read data, such as control parameters, dates etc. from non-volatile memory 14. At a certain point during the execution of the program it may become necessary to write or change data in the non-volatile memory 12. At this point, program part 21 is executed, which loads the data and an address or addresses for storing the data into a register in the processing unit 10 or into auxiliary memory 14. Alternatively, the data may be indicated implicitly, for example in case the content of the relevant addresses must be cleared.

Subsequently, program part 21 causes the processing unit to jump to an instruction address in auxiliary memory 14. This is the instruction address of an instruction in program part 22. Program part 22 causes the processing unit 10 to signal the non-volatile memory 12 to start a data change operation. Once the data change operation has been started, the processor unit 10 continues to execute instructions from auxiliary memory 14.

Instructions from a program part 23 instruct the processing unit to test whether an exceptional situation arises. If not the processing unit 10 continues with instructions from program part 27, which instruct the processing unit 10 to poll the non-volatile memory 12 to determine whether the change of data has been completed. If not, execution of program part 23 is repeated. If the change of data has been completed, an instruction from program part 28 causes the processing unit 10 to jump back to an instruction from program part 29 in non-volatile memory, which resume execution of the program of program part 20.

If the test of program part 23 shows that an exceptional situation occurs, processing unit 10 starts executing instructions from program part 24 in auxiliary memory 14. These instructions cause the processing unit 10 to issue a signal to the non-volatile memory 12 to suspend changing of data. Subsequently, these instructions from program part 24 in auxiliary memory 14 cause the processing unit 10 to jump to an instruction in program part 25 in non-volatile memory 12. The instructions in program part 25 cause the processing unit 10 to perform whatever actions are appropriate in response to the exception.

After these actions program part 25 causes the processing unit 10 to jump back to an instruction from program part 26 in auxiliary memory 14. Program part 26 causes the processing unit 10 to signal to the non-volatile memory 12 that the suspended changing of data must be resumed. Subsequently, control of the processing unit is give back to program part 27.

The instructions of program part 25 in non-volatile memory perform for example processing of an incoming data sample, or timed control of some peripheral (not shown). Clearly, these instructions cannot use the data whose changing has been suspended to execute these instructions from non-volatile memory 12. Preferably, therefore the program stored in non-volatile memory contains provisions to avoid use of such data, for example in the form of flags which indicate which data may be used or which parts of the program may be executed.

If use of the changing data cannot be avoided, the data is preferably copied to auxiliary memory 14 before the start of changing the data in non-volatile memory 12. In this case, when instructions from non-volatile memory 12 are executed during suspension of data changing, these instructions preferably read the relevant data from auxiliary memory 14. This may be realized by using instructions that compute the address of the data from an address in base register. In this case, the base register is used to point to non-volatile memory 12 when the instructions are executed normally (i.e. without suspension) and the base register is used to point to auxiliary memory 14 when the instructions are executed during a suspension of a data change.

The instructions in the auxiliary memory 14 may be loaded into the auxiliary memory when the apparatus of FIG. 1 is initialized, or they may be loaded by program part 21 when a change of data is to be executed. Alternatively, a ROM (read only memory) or a small non-volatile memory may be used as auxiliary memory 14.

As shown in FIG. 2, the signal to suspend the changing of data is generated by a program part in the auxiliary memory. This provides a very flexible low cost control over suspension, but without deviating from the invention, suspension may also be controlled by hardware.

Figure 3:
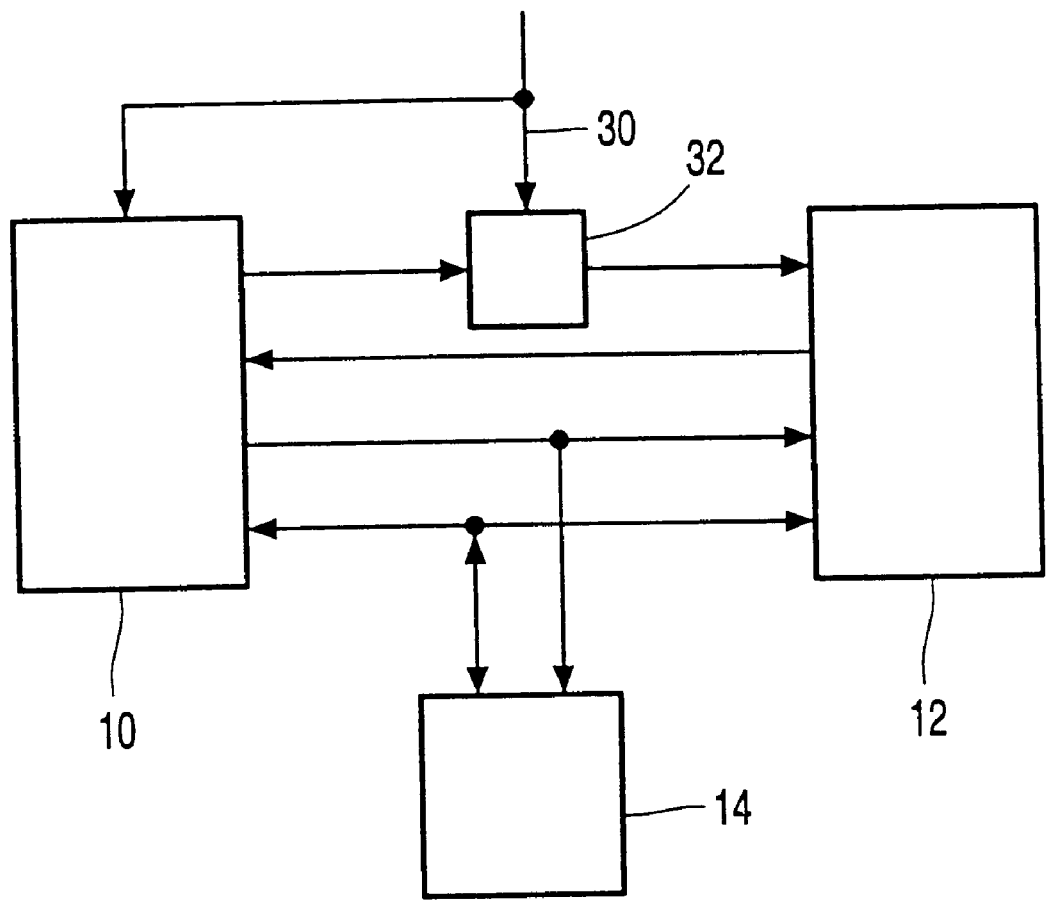
FIG. 3 shows a further apparatus.

FIG. 3 shows a further apparatus, where suspension of data changing is controlled by hardware. In addition to the components shown in FIG. 1, the apparatus of FIG. 3 has an interrupt input 30 and a suspension flip-flop 32. The interrupt input 30 is coupled to the processing unit 10 and a set input of the suspension flip-flop 32. The suspension flip-flop 32 has an output coupled to the suspension input of non-volatile memory 12. The processing unit 10 has an output port coupled to a reset input of suspension flip-flop 32.

In operation, when a data change is executed, program control is transferred to instructions in auxiliary memory 14, as before. A flag is set in auxiliary memory, to indicate that data changing is active.

An interrupt on the interrupt input 30 causes suspension of data changing (by setting the suspension flip-flop 32) and transfer of control to an interrupt program with instructions stored in non-volatile memory. In response to the interrupt the processing unit 10 loads an interrupt address in the non-volatile memory 12 and executes instructions starting from that address. After the interrupt has been handled, it is tested whether a data change was going on when the interrupt occurred, for example by testing the flag in auxiliary memory 14. When this is the not the case, program control is normally transferred back to instructions in non-volatile memory 12. If data changing was going on, control is given passed to instructions of a "finish interrupt routine" in auxiliary memory. These instructions reset the suspension flip-flop 32 and then pass control back to the instruction in auxiliary memory to was to be executed when the interrupt occurred.

What is claimed is:

1. A data processing apparatus comprising a processing unit;

an auxiliary memory coupled to the processing unit;

a programmable non-volatile memory coupled to the processing unit for supply of instructions and data to the processing unit, the non-volatile memory storing a program for execution by the processing unit, the program containing an instruction for jumping to a subprogram in the auxiliary memory, the subprogram changing data in the non-volatile memory for use by the program and returning control to the program in non-volatile memory when completion of said changing is detected, the apparatus comprising means for temporarily transferring control from the subprogram to one or more instructions in the non-volatile memory after suspending said changing of the data before said changing is complete and resuming said changing upon return of control from the one or more instructions to the subprogram.

2. A data processing apparatus according to claim 1, wherein said means comprise instructions stored in the auxiliary memory for suspending and resuming said changing and an instruction for jumping to said one or more instructions in the non-volatile memory between said suspending and resuming.

3. A data processing apparatus according to claim 2, wherein said instructions stored in the auxiliary memory are activatable by an interrupt.

4. A data processing apparatus according to claim 2, wherein the subprogram periodically jumps to said instructions stored in the auxiliary memory.

5. A data processing system according to claim 1, wherein said means are activatable by an exception caused by the execution of the program.

6. A data processing system according to claim 1, the program containing a section for adaptively selecting one or more blocks from a number of blocks of instructions stored in the non-volatile memory, the one or more blocks being expected to be executed during said changing of the data, the section selectively loading those selected blocks into the auxiliary memory, and the section loading instructions into the auxiliary memory to activate said means if a non-selected one of the number of blocks is to be executed during said changing.

* * * * *